(12) United States Patent
Burcham et al.

(10) Patent No.: US 9,398,454 B1
(45) Date of Patent: Jul. 19, 2016

(54) IN-CAR HEAD UNIT WIRELESS COMMUNICATION SERVICE SUBSCRIPTION INITIALIZATION

(75) Inventors: Robert H. Burcham, Overland Park, KS (US); Ashish K. Singh, Herndon, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 1067 days.

(21) Appl. No.: 13/455,121

(22) Filed: Apr. 24, 2012

(51) Int. Cl.
*H04W 4/00* (2009.01)
*H04M 11/00* (2006.01)
*H04W 12/06* (2009.01)
*G07C 5/00* (2006.01)

(52) U.S. Cl.
CPC ............. *H04W 12/06* (2013.01); *G07C 5/008* (2013.01)

(58) Field of Classification Search
CPC ..... H04W 12/06; H04W 12/04; H04W 12/10; H04W 12/12; G07C 5/008
USPC ................................. 455/435.1, 406
See application file for complete search history.

(56) References Cited

U.S. PATENT DOCUMENTS

| | | | |
|---|---|---|---|
| 5,892,900 | A | 4/1999 | Ginter et al. |
| 6,622,083 | B1 | 9/2003 | Knockheart et al. |
| 7,209,964 | B2 | 4/2007 | Dugan et al. |
| 7,366,892 | B2 | 4/2008 | Spaur et al. |
| 7,376,392 | B2 | 5/2008 | Myojo |
| 7,454,473 | B2 | 11/2008 | Suzuki |
| 7,912,224 | B2 | 3/2011 | Lee et al. |
| 7,949,375 | B2 | 5/2011 | Kortge |
| 7,966,111 | B2 | 6/2011 | Moinzadeh et al. |
| 8,271,050 | B2 | 9/2012 | Weiss |
| 8,457,686 | B2 | 6/2013 | Przybylski |
| 8,484,707 | B1 | 7/2013 | Bertz et al. |
| 8,527,164 | B2 | 9/2013 | Staudinger et al. |
| 8,548,532 | B1 | 10/2013 | Ng |
| 8,606,335 | B2 | 12/2013 | Ozaki |
| 8,626,152 | B2 | 1/2014 | Farrell et al. |
| 8,630,747 | B2 | 1/2014 | Burcham et al. |

(Continued)

FOREIGN PATENT DOCUMENTS

| | | |
|---|---|---|
| DE | 102011112546 A1 | 4/2014 |
| JP | 20062441 A | 9/2006 |

(Continued)

OTHER PUBLICATIONS

Restriction Requirement dated Mar. 19, 2015, U.S. Appl. No. 13/463,799, filed May 3, 2012.

(Continued)

*Primary Examiner* — Omoniyi Obayanju

(57) ABSTRACT

A method for registering an in-vehicle head unit to receive wireless communication services. The method comprises determining by the head unit that a motor vehicle in which the head unit is installed has been turned on and, while the motor vehicle remains turned on, the head unit completing a first stage of registration during which a reference to a web site is created, wherein the reference is valid for a predefined period of time after completion of the first stage of registration. The method further comprises creating a subscription account to provide the wireless communication services to the head unit during a second stage of registration, wherein the second stage of registration is based on accessing the web site using the reference before expiration of the predefined period of time.

18 Claims, 5 Drawing Sheets

(56) References Cited

U.S. PATENT DOCUMENTS

| | | | |
|---|---|---|---|
| 8,676,199 | B2 | 3/2014 | Madhavan et al. |
| 8,750,942 | B1 | 6/2014 | Ng |
| 8,787,949 | B2 | 7/2014 | Sumcad et al. |
| 9,002,574 | B2 | 4/2015 | Garrett et al. |
| 9,031,498 | B1 | 5/2015 | Bertz et al. |
| 9,032,547 | B1 | 5/2015 | Hohler et al. |
| 9,110,774 | B1 | 8/2015 | Bonn et al. |
| 9,173,238 | B1 | 10/2015 | Bloomcamp et al. |
| 9,252,951 | B1 | 2/2016 | Katzer et al. |
| 2003/0096641 | A1 | 5/2003 | Odinak |
| 2003/0120601 | A1 | 6/2003 | Ouye et al. |
| 2003/0224840 | A1 | 12/2003 | Frank et al. |
| 2004/0083041 | A1 | 4/2004 | Skeen et al. |
| 2004/0125957 | A1 | 7/2004 | Rauber et al. |
| 2004/0157650 | A1 | 8/2004 | Wissinger et al. |
| 2005/0021744 | A1 | 1/2005 | Haitsuka et al. |
| 2005/0065779 | A1 | 3/2005 | Odinak |
| 2005/0113102 | A1 | 5/2005 | Kwon et al. |
| 2006/0059480 | A1 | 3/2006 | Kimoto |
| 2006/0143463 | A1 | 6/2006 | Ikeda et al. |
| 2006/0154659 | A1 | 7/2006 | Roter et al. |
| 2006/0168578 | A1 | 7/2006 | Vorlicek |
| 2007/0028220 | A1 | 2/2007 | Miller et al. |
| 2007/0086579 | A1 | 4/2007 | Lorello et al. |
| 2007/0113269 | A1 | 5/2007 | Zhang |
| 2007/0124043 | A1 | 5/2007 | Ayoub et al. |
| 2007/0124045 | A1 | 5/2007 | Ayoub et al. |
| 2007/0124046 | A1 | 5/2007 | Ayoub et al. |
| 2007/0160199 | A1 | 7/2007 | Sekiguchi et al. |
| 2007/0288423 | A1 | 12/2007 | Kimoto |
| 2008/0034126 | A1 | 2/2008 | Baker |
| 2008/0072047 | A1 | 3/2008 | Sarikaya et al. |
| 2008/0148374 | A1 | 6/2008 | Spaur et al. |
| 2008/0162676 | A1 | 7/2008 | Magnusson |
| 2008/0289018 | A1 | 11/2008 | Kawaguchi |
| 2008/0289044 | A1 | 11/2008 | Choi |
| 2008/0307086 | A1 | 12/2008 | Brooks et al. |
| 2009/0028082 | A1 | 1/2009 | Wynn et al. |
| 2009/0049119 | A1 | 2/2009 | Marcinkiewicz et al. |
| 2009/0109941 | A1 | 4/2009 | Carter |
| 2009/0217036 | A1 | 8/2009 | Irwin et al. |
| 2009/0287499 | A1* | 11/2009 | Link, II ............ G06Q 30/018 705/317 |
| 2010/0097239 | A1 | 4/2010 | Campbell et al. |
| 2010/0136944 | A1 | 6/2010 | Taylor et al. |
| 2010/0197362 | A1 | 8/2010 | Saitoh et al. |
| 2010/0220250 | A1 | 9/2010 | Vanderwall et al. |
| 2010/0234071 | A1 | 9/2010 | Shabtay et al. |
| 2010/0235285 | A1 | 9/2010 | Hoffberg |
| 2010/0260350 | A1 | 10/2010 | Chutorash et al. |
| 2010/0285787 | A1 | 11/2010 | Matsuda |
| 2011/0009107 | A1 | 1/2011 | Guba et al. |
| 2011/0086668 | A1 | 4/2011 | Patel |
| 2011/0090908 | A1 | 4/2011 | Jacobson et al. |
| 2011/0099316 | A1 | 4/2011 | Tseng et al. |
| 2011/0252415 | A1 | 10/2011 | Ricci |
| 2011/0257973 | A1 | 10/2011 | Chutorash et al. |
| 2011/0263293 | A1 | 10/2011 | Blake et al. |
| 2011/0295444 | A1 | 12/2011 | Westra et al. |
| 2011/0310731 | A1 | 12/2011 | Park et al. |
| 2012/0028607 | A1* | 2/2012 | Tengler ............ H04L 63/126 455/411 |
| 2012/0109406 | A1 | 5/2012 | Yousefi et al. |
| 2012/0127139 | A1 | 5/2012 | Hayami et al. |
| 2012/0134497 | A1 | 5/2012 | Roitshtein et al. |
| 2012/0159638 | A1 | 6/2012 | McDade, Sr. |
| 2012/0167071 | A1 | 6/2012 | Paek |
| 2012/0183221 | A1 | 7/2012 | Alasry et al. |
| 2012/0203557 | A1 | 8/2012 | Odinak |
| 2012/0282895 | A1 | 11/2012 | Bai et al. |
| 2012/0324046 | A1 | 12/2012 | Park |
| 2013/0082820 | A1 | 4/2013 | Tieman |
| 2013/0205026 | A1 | 8/2013 | Ricci |
| 2013/0218400 | A1 | 8/2013 | Knoop et al. |
| 2013/0226391 | A1 | 8/2013 | Nordbruch et al. |
| 2013/0297456 | A1 | 11/2013 | Annan et al. |
| 2014/0053261 | A1 | 2/2014 | Gupta et al. |
| 2014/0068010 | A1 | 3/2014 | Nicholson et al. |
| 2014/0087760 | A1 | 3/2014 | Bennett |
| 2014/0130036 | A1 | 5/2014 | Gurikar et al. |
| 2014/0222298 | A1 | 8/2014 | Gurin |

FOREIGN PATENT DOCUMENTS

| | | |
|---|---|---|
| WO | 2013166418 A2 | 11/2013 |
| WO | 2013173331 A1 | 11/2013 |

OTHER PUBLICATIONS

Final Office Action dated Mar. 17, 2015, U.S. Appl. No. 13/769,268, filed Feb. 15, 2013.

Notice of Allowance dated Mar. 12, 2015, U.S. Appl. No. 13/844,226, filed Mar. 15, 2013.

Amireddy, Sridhar Reddy, et al., Patent Application entitled, "Vehicle Remote Operations Control," filed Apr. 28, 2015, U.S. Appl. No. 14/698,522.

First Action Interview Pre-Communication dated Aug. 21, 2012, U.S. Appl. No. 13/218,503, filed Aug. 26, 2011.

First Action Interview Office Action dated Jan. 3, 2013, U.S. Appl. No. 13/218,503, filed Aug. 26, 2011.

Final Office Action dated May 7, 2013, U.S. Appl. No. 13/218,503, filed Aug. 26, 2011.

First Action Interview Pre-Interview Communication dated Oct. 26, 2012, U.S. Appl. No. 13/156,438, filed Jun. 9, 2011.

Notice of Allowance dated Feb. 26, 2013, U.S. Appl. No. 13/156,438, filed Jun. 9, 2011.

First Action Interview Pre-Communication dated Jan. 31, 2012, U.S. Appl. No. 13/246,554, filed Sep. 27, 2011.

FAIPP Office Action dated May 21, 2012, U.S. Appl. No. 13/246,554, filed Sep. 27, 2011.

Final Office Action dated Sep. 5, 2012, U.S. Appl. No. 13/246,554, filed Sep. 27, 2011.

Advisory Action dated Nov. 2, 2012, U.S. Appl. No. 13/246,554, filed Sep. 27, 2011.

Office Action dated Dec. 5, 2012, U.S. Appl. No. 13/246,554, filed Sep. 27, 2011.

Notice of Allowance dated May 20, 2013, U.S. Appl. No. 13/246,554, filed Sep. 27, 2011.

Office Action dated Mar. 13, 2013, U.S. Appl. No. 13/471,107, filed May 14, 2012.

Aboda, B., et al., "Exentsible Authentication Protocol (EAP)", Network Working Group, RFC 3748, Standards Track, Jun. 2004.

Shipley, Trevor D., et al. Patent Application entitled "Mobile Communication System Identity Pairing," filed Aug. 26, 2011, U.S. Appl. No. 13/218,503.

Bertz, Lyle T., et al., Patent Application entitled "Secure Changing Auto-Generated Keys for Wireless Access," filed Jun. 9, 2011, U.S. Appl. No. 13/156,438.

Ng, Sei Y., Patent Application entitled "Head Unit to Handset Interface and Integration," filed Sep. 27, 2011, U.S. Appl. No. 13/246,554.

Bertz, Lyle T., et al. Patent Application entitled "Automotive Multi-Generation Connectivity," filed Apr. 26, 2011, U.S. Appl. No. 13/094,494.

Annan, Brandon C., et al. Patent Application entitled "Methods and Systems of Digital Rights Management for Vehicles," filed May 3, 2012, U.S. Appl. No. 13/463,799.

Burcham, Robert H., et al. Patent Application entitled "Alternative Authorization for Telematics," filed May 14, 2012, U.S. Appl. No. 13/471,107.

Bloomcamp, Eric Michael, et al. Patent Application entitled "Dual Path In-Vehicle Communication," filed Feb. 15, 2012, U.S. Appl. No. 13/769,268.

Bonn, Michael J., et al. Patent Application entitled "System and Method of Utilizing Driving Profiles via a Mobile Device," filed Mar. 15, 2012, U.S. Appl. No. 13/844,226.

Final Office Action dated Jun. 16, 2014, U.S. Appl. No. 13/218,503, filed Aug. 26, 2011.

(56) References Cited

OTHER PUBLICATIONS

Office Action—Restriction Requirement dated May 7, 2014, U.S. Appl. No. 13/094,494, filed Apr. 26, 2011.
Katzer, Robin D., "Vehicle Key Function Control From a Mobile Phone Based on Radio Frequency Link From Phone to Vehicle," filed Jun. 13, 2014, U.S. Appl. No. 14/304,861.
Ng, Sei Y., Patent Application entitled "Head Unit to Handset Interface and Integration," filed Aug. 20, 2013, U.S. Appl. No. 13/971,658.
Bloomcamp, Eric M., et al., Patent Application entitled Authenticating Mobile Device for on Board Diagnostic System Access, filed Sep. 23, 2013, U.S. Appl. No. 14/034,475.
Advisory Action dated Aug. 1, 2013, U.S. Appl. No. 13/218,503, filed Aug. 26, 2011.
Notice of Allowance dated Aug. 26, 2013, U.S. Appl. No. 13/471,107, filed May 14, 2012.
Advisory Action dated Sep. 26, 2014, U.S. Appl. No. 13/218,503, filed Aug. 26, 2011.
Office Action dated Aug. 28, 2014, U.S. Appl. No. 13/094,494, filed Apr. 26, 2011.
Office Action dated Aug. 12, 2014, U.S. Appl. No. 13/769,268, filed Feb. 15, 2013.
Office Action dated Jul. 14, 2014, U.S. Appl. No. 13/661,536, filed Oct. 26, 2012.
Hohler, Rick A., et al., Patent Application entitled "Provisioning Vehicle based Digital Rights Management for Media Delivered via Phone," filed Oct. 26, 2012, U.S. Appl. No. 13/662,536.
Finnerty, Brian J., et al., Patent Application entitled "Method for Authenticating Driver for Registration of In-Vehicle Telematics Unit," filed Oct. 31, 2014, U.S. Appl. No. 14/530,667.
Office Action dated Sep. 9, 2015, U.S. Appl. No. 13/463,799, filed May 3, 2012.
Notice of Allowance dated Sep. 18, 2015, U.S. Appl. No. 14/304,861, filed Jun. 13, 2014.
Foreign Communication From a Related Counterpart Application, International Search Report and Written Opinion dated Jun. 13, 2013, International Application No. PCT/US13/40940 filed on May 14, 2013.
Foreign Communication From a Related Counterpart Application, International Search Report and Written Opinion dated Dec. 23, 2013, International Application No. PCT/US13/39514 filed on May 3, 2013.
First Action Interview Pre-Communication dated Nov. 15, 2013, U.S. Appl. No. 13/791,658, filed Aug. 20, 2013.
Notice of Allowance dated Jan. 30, 2014, U.S. Appl. No. 13/791,658, filed Aug. 20, 2013.
Foreign Communication From a Related Counterpart Application, International Preliminary Report on Patentability dated Nov. 13, 2014, PCT/US13/39514 filed on May 3, 2013.
Foreign Communication From a Related Counterpart Application, International Preliminary Report on Patentability dated Nov. 27, 2014, PCT/US13/40940 filed on May 14, 2013.
Notice of Allowance dated Dec. 3, 2014, U.S. Appl. No. 13/094,494, filed Apr. 26, 2011.
First Action Interview Pre-Communication dated Dec. 1, 2014, U.S. Appl. No. 13/844,226, filed Mar. 15, 2013.
Notice of Allowance dated Jan. 6, 2015, U.S. Appl. No. 13/661,536, filed Oct. 26, 2012.
Supplemental Notice of Allowance dated Jan. 30, 2015, U.S. Appl. No. 13/661,536, filed Oct. 26, 2012.
Office Action dated Feb. 5, 2014, U.S. Appl. No. 13/218,503, filed Aug. 26, 2011.
Notice of Allowance dated Jun. 12, 2015, U.S. Appl. No. 13/769,268, filed Feb. 15, 2013.
First Action Interview Pre-Communication dated Jul. 9, 2015, U.S. Appl. No. 14/034,475, filed Sep. 23, 2013.
Restriction Requirement dated Feb. 24, 2015, U.S. Appl. No. 14/304,861, filed Jun. 13, 2014.
Office Action dated Jun. 30, 2015, U.S. Appl. No. 14/304,861, filed Jun. 13, 2014.
Belkin, Wireless Network Access Point User Manual, published by Belkin Corporation, 2003, pp. 1-36.
Office Action dated Jan. 13, 2016, U.S. Appl. No. 13/218,503, filed Aug. 26, 2011.
Final Office Action dated Mar. 10, 2016, U.S. Appl. No. 13/463,799, filed May 3, 2012.
Final Office Action dated Mar. 8, 2016, U.S. Appl. No. 14/034,475, filed Sep. 23, 2013.

\* cited by examiner

IN-CAR HEAD UNIT WIRELESS COMMUNICATION SERVICE SUBSCRIPTION INITIALIZATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Creation of new accounts or profiles may involve presenting a variety of credentials and/or security tokens for use to authenticate the user: to reasonably promote confidence that the user is who they claim to be before creating the new account and/or profile. A variety of authentication methods may be used. For creating an account or profile associated with a new motor vehicle, the circumstance of being in the vehicle with the key in the ignition switch with the switch turned on may be used to authenticate an individual in the car as an owner of the vehicle. Alternatively, other information already known to be associated with an individual may be used to create an account or a profile, such as a postal address, a date of birth, and/or other information particular to the individual.

Motor vehicles increasingly are providing wireless communications based functionality. In an embodiment, a head unit may be installed in a motor vehicle that provides a variety of functionality that depends at least partly on wireless communications connectivity via a cellular network, for example voice communications, web browsing, mobile applications, and other applications. A subscription to a wireless communication service may be established to enable wireless connectivity of the head unit with the cellular network.

SUMMARY

In an embodiment, a method for registering an in-vehicle head unit to receive wireless communication services is disclosed. The method comprises determining by the head unit that a motor vehicle in which the head unit is installed has been turned on and, while the motor vehicle remains turned on, the head unit completing a first stage of registration during which a reference to a web site is created, wherein the reference is valid for a predefined period of time after completion of the first stage of registration. The method further comprises creating a subscription account to provide the wireless communication services to the head unit during a second stage of registration, wherein the second stage of registration is based on accessing the web site using the reference before expiration of the predefined period of time.

In an embodiment, a method for registering an in-vehicle head unit to receive wireless communication services is disclosed. The method comprises determining by the head unit that a motor vehicle in which the head unit is installed has been turned on and, while the motor vehicle remains turned on, the head unit completing a first stage of registration during which a reference to a web site is created, wherein the reference encapsulates a vehicle identification number (VIN) of the motor vehicle and an electronic mail address of a subscriber, and wherein the reference is valid for a predefined period of time after completion of the first stage of registration. The method further comprises creating a subscription account to provide the wireless communication services to the head unit during a second stage of registration, wherein the second stage of registration is based on accessing the web site using the reference before expiration of the predefined period of time and based on the vehicle identification number.

In an embodiment, a method for registering an in-vehicle head unit to receive wireless communication services is disclosed. The method comprises determining by the head unit that a motor vehicle in which the head unit is installed has been turned on and, while the motor vehicle remains turned on, the head unit completing a first stage of registration during which a reference to a web site of a manufacturer of the motor vehicle is created, wherein the reference is valid for a predefined period of time after completion of the first stage of registration. The method further comprises creating a provisional subscription entry in a wireless service provider data store as part of the first stage of registration, receiving an access to the web site of the manufacturer using the reference before the expiration of the predefined period of time, and, based on the access to the web site using the reference and based on the provisional subscription entry, creating a subscription account based on the provisional subscription entry in the wireless service provider data store to provide the wireless communication services to the head unit.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
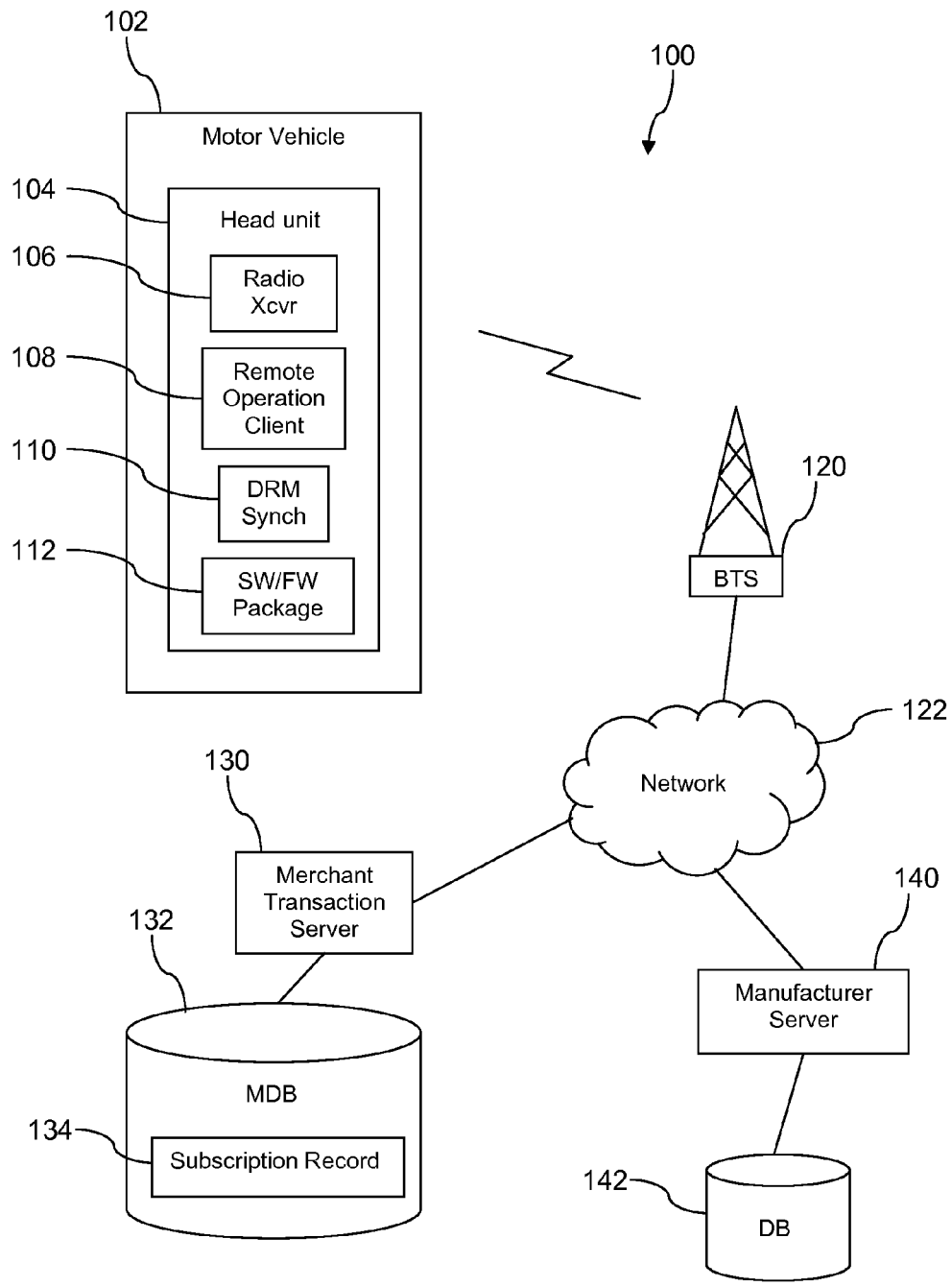
FIG. 1 is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A system and method of registering a head unit to a wireless communication service subscriber is taught. In an embodiment, the head unit is a central communication hub for a motor vehicle and is provided with cellular wireless communication services. While for purposes of simplifying the description that follows occasional reference will be made to a head unit installed in a car, it is understood that the teachings of the present disclosure equally apply to registering a head unit installed in other motor vehicles such as a pick-up truck, a sports utility vehicle (SUV), a truck, a tractor as used in a tractor trailer or "18 wheeler," a bus, or other motor vehicle. The head unit may monitor the status of the vehicle by receiving inputs from sensors via an in-vehicle communications bus. The head unit may provide a variety of interfaces for presenting the status of the vehicle and for accessing functionality of the vehicle. The head unit provides a cellular radio transceiver for communicating with a wireless network to deliver voice communication services, data communication services, and other wireless communication services to a user of the vehicle.

The head unit passes through a plurality of different states as life cycle events occur. The functionality provided by the head unit may be different in the different states. When the vehicle is sold to an owner, a two-stage process of registering the head unit to a wireless communication service subscriber takes place. The first stage of registration is completed in the vehicle, with the vehicle turned on. A registration dialog box or other interface is selected for presentation on an in-vehicle display coupled to and/or integral with the head unit. Information associated with the subscriber is entered into the interface and transmitted to the wireless service provider. The information may include a vehicle identification number (VIN) automatically determined by the head unit, for example by the head unit reading the VIN from the in-vehicle communication bus. The information may include an electronic mail address of the subscriber. Alternatively, or in addition, the information may include a telephone number, for example a telephone number of a personal mobile phone belonging to the driver or user. A computer system at the wireless service provider receives the information and creates a provisional subscriber record and stores the provisional subscriber record in a data store. Additionally, the computer system at the wireless service provider creates a tailored reference to a web page maintained by the manufacturer of the vehicle and sends an email to the subscriber containing the tailored reference. Alternatively, if a telephone number was provided in the information, the computer system at the wireless service provider may send the tailored reference in a short message service (SMS or text) message to the user. In an embodiment, the tailored reference may encrypt or otherwise encapsulate information needed to complete the second stage of the registration process, for example information that promotes identifying the provisional subscriber record created during the first stage of the registration process.

The second stage of registration is completed by the subscriber accessing a web site maintained by the manufacturer of the vehicle using the tailored link. The access returns an electronic form to the subscriber's accessing device, for example a desk top computer display screen, that is tailored to the specific vehicle and head unit functionality package purchased. The subscriber is requested to provide additional information. When the subscriber provides the additional information, some of the information is sent from the manufacturer's computer system to the computer system of the wireless service provider, including information that identifies the provisional subscriber record created during the first stage of the registration process. The computer system of the wireless service provider completes the process of registering the head unit to the subscriber and converts the provisional subscription record to an active subscription record. In an embodiment, the registration process comprises a third stage in which the subscriber provides payment information before the provisional subscriber record is converted to an active subscriber record.

The active subscriber record is associated with the enablement of communication services to the vehicle, for example communication services that are not disabled after a relatively short time window allowed for completing the registration process after purchase of the vehicle. The active subscriber record may further be associated with enabling previously unavailable communication services to the vehicle, for example personalized communication services that may depend on accessing confidential information about the user such as profile information and/or financial account numbers. The profile information may comprise information provided by the subscriber or use pattern information collected over time by the wireless service provider. The profile information may comprise demographic information of the subscriber. The financial account numbers may include credit card numbers, authorization codes, debit card numbers, personal identification numbers (PINs), and other confidential financial account information.

The tailored reference is valid for a predefined time duration extending from the completion of the first stage of registration, for example for about a day. If the second stage of registration is not initiated by accessing the manufacturer's web site using the tailored reference before the expiration of the predefined time period, the reference cannot be used to access the web site, and the second stage of registration cannot be completed. In this event, the subscriber must complete stage one of the registration process again.

Typically, when the vehicle has been sold, a pre-sale functionality of the head unit is replaced by a head unit functionality package determined by the vehicle model, the options package of the vehicle, or by other means. This head unit functionality is enabled for a relatively short period of time initially, and if the head unit is not registered to the subscription account timely the head unit functionality will become disabled. After the head unit is registered to the subscription account, the head unit functionality remains enabled for periods of time according to the specific provisions of the vehicle sales contract and/or the provisions of the subscription account. For example, the head unit functionality may be enabled for a six month period of time after completion of the registration process. If the subscriber wishes to continue the head unit functionality, the subscriber may thereafter pay a monthly service charge for continuing the service. Alternatively, the subscriber may choose to alter the head unit functionality by downgrading or upgrading his or her services, within the constraints of the head unit capabilities.

After the completion of the second stage of registration, it is no longer possible to conduct the first stage of registration. If it is desired to change the registration of the head unit, for example when a parent gives the vehicle to a child or when the vehicle is sold, the subscriber must first unregister the head unit, and the head unit is then returned to an initial state.

The head unit passes through a sequence of life cycle events that relate to the function of the head unit at these different stages in its life cycle. In an embodiment, a first life cycle event occurs when the head unit is installed into a motor vehicle on the assembly line of a manufacturing plant. When the head unit is first powered on after installation in the vehicle, the head unit may read a vehicle identification number (VIN) from a communications bus of the vehicle and present an interface on a display screen coupled to the head unit requesting that a code be entered, for example a four digit code. When the appropriate code is entered, the head unit associates itself to the subject vehicle. Because the wireless communication service provider subsidizes the head unit, the completion of the first life cycle event may trigger payment of the subsidy to the motor vehicle manufacturer by the wireless communication service provider or trigger payment at a next periodic settlement date. A second life cycle event may occur when the vehicle is rolled off the assembly line and onto a staging lot at the assembly plant. A third life cycle event may occur when the vehicle is loaded onto a truck or freight car of a train for delivery to a vehicle sales dealership. It is understood that two or more of the life cycle events identified herein may be combined as a single life cycle event or that some of the life cycle events identified herein as a single life cycle event may comprise a plurality of life cycle events.

A fourth life cycle event may occur when the vehicle is off-loaded at the vehicle sales dealership. The fourth life cycle event may trigger the loading of a pre-sales wireless communication package of capabilities to the head unit. The pre-sales package may not comprise capabilities that depend upon an identity of an individual such as an electronic wallet promoting credit card purchases, personal profile based restaurant recommendations, synchronization with a personal calendar, and other features that depend on personal information. The pre-sales package may depend on the hardware and/or firmware configuration of the head unit. In an embodiment, a fraction of the vehicles on the dealer parking lot may have the pre-sales package, for example 20% of the cars of a car model may have a demonstration package installed while the remaining 80% of the cars of the same car model have no pre-sales package installed. When a prospective customer is test driving a car with a salesman, they are encouraged to drive one of the cars with the pre-sales package installed. This fractional installation of pre-sales packages may reduce costs to the vehicle sales dealership and/or to the vehicle manufacturer for the wireless communication services.

A fifth life cycle event may occur when the vehicle is sold. After the vehicle is sold, the pre-sales package is disabled and a post sales package is installed and/or enabled on the head unit. In an embodiment, some or all of the post sales package of functionality may be pre-installed on the head unit as firmware and/or software in a dormant state. Alternatively, some or all of the post sales package of functionality may be downloaded wirelessly to the head unit. In an embodiment, at least a portion of the post sales package may be dynamically generated by selecting from a comprehensive repository of all available head unit functionalities based on a sales code capability or set of capabilities associated with the as-sold motor vehicle. The post sales package of head unit functionality may be enabled on the head unit pursuant to the completion of the sale.

Initially the post sales package may be enabled for a relatively short time duration, for example for a day, for three days, or for some other relatively short time duration. It is intended that the purchaser of the motor vehicle will register the head unit to a wireless communication service subscription account, and on completion of this registration the post sales package enablement is extended for a relatively longer period of time, for example extended for a month, for three months, for six months or for some other initial trial period. If the purchaser does not register the head unit to the wireless communication service subscription account timely, the wireless communications service to the head unit is interrupted. After registration of the head unit to the subscription account, head unit functionality that depends on personal information may be enabled. In an embodiment, after registration of the head unit has completed, for example after the wireless communication service subscription has been initialized for the head unit, the head unit may be used for connecting to and providing in-vehicle wireless communication services which may comprise one or more of voice communication, data communication, Internet browsing, short message service (SMS or text) messaging, email, and other communication services.

In an embodiment, one or more additional communication subscriptions may be established for the head unit that are subordinate to or are secondary to the primary communication subscription associated with the head unit described above. The primary subscription may promote inviting additional users to use the communication services provided by the head unit according to specific rights defined in subordinate and/or secondary subscriptions. The specific rights defined for the secondary subscriptions may identify specific communication services that may be used by the additional users, for example a teenage child of the owner of the vehicle or a close friend of the teenage child of the owner. As an example, the secondary subscription may allow the additional user to send and receive text messages and/or voice messages but may disallow Internet browsing sessions or live streaming sessions. As a different example the specific rights defined for the secondary subscriptions may identify one or more category of web sites that can be browsed to by the additional user and/or identify one or more category of web sites that to which browsing by the additional user is not allowed. The specific rights defined for the secondary subscriptions may designate a time duration of the rights, for example a duration of an hour, a duration of a day, or some other relatively short time duration. It is understood that the specific rights of the secondary subscription associated with the additional users do not exceed the specific rights of the primary subscription. In an embodiment, the secondary subscription may be viewed as encapsulated within or a layer over the primary subscription and transparent to the wireless service provider. Alternatively, in another embodiment, the secondary subscription may be managed, at least in part, by the wireless service provider, and the additional users may have subscription accounts with the subject wireless service provider.

Turning now to FIG. 1, a system 100 is described. In an embodiment, the system 100 comprises a motor vehicle 102. The motor vehicle 102 may be any of an automobile or car, a sports utility vehicle (SUV), a pick-up truck, a mini-van, a van, a truck, a delivery truck, a tractor of a tractor-trailer or "18-wheeler" combination, or other motorized vehicle. The vehicle 102 has a head unit 104 installed that provides a centralized electronic communication capability. The head unit 104 may receive inputs from in-vehicle sensors, is coupled to a radio antenna, and is coupled to a display and input device, for example a touchscreen. In an embodiment, the display and the input device may be integrated with and/or packaged with the head unit. The head unit 104 comprises one or more cellular radio transceiver 106, a remote operation client (ROC) (108), a digital rights management (DRM) synch application 110, and a software/firmware package 112.

The radio transceiver 106 is operable to establish radio communication links with a base transceiver station 120 using a code division multiple access (CDMA) wireless communication protocol, a global system for mobile communications (GSM) wireless communication protocol, a long-term evolution (LTE) wireless communication protocol, a worldwide interoperability for microwave access (WiMAX) wireless communication protocol, or other cellular wireless communication protocol. The head unit 104 may comprise a plurality of radio transceivers 106. Alternatively, the radio transceiver 106 may be capable of establishing cellular radio communication links according to two or more cellular wireless communication protocols. In an embodiment, the head unit 104 may comprise one or more additional radio transceivers to provide other kinds of wireless communication, for example a WiFi radio transceiver, a Bluetooth® radio transceiver, a ZigBee® radio transceiver, a near-field-communication (NFC) radio transceiver, and/or other radio transceivers. The radio transceiver 106, and possibly other radio transceivers in the head unit 104, provides support for at least some of the functionality of the head unit 104. For example, the radio transceiver 106 may support use of the head unit 104 to perform voice communications in the vehicle 102. The radio transceiver 106 may support using the head unit 104 to look up a business address or other content via the Internet. The radio transceiver 106 may support completing an electronic purchase using an electronic wallet installed on the head unit 104. These are just a few cursory examples of communication functionality that the radio transceiver 106 may enable.

The software/firmware package 112, herein after referred to as the package 112, comprises the software and/or firmware that provides optional functionality for the head unit 104. As used herein, the term "optional" implies that the motor vehicle 102 and the head unit 104 can be operated if the package 112 is disabled, albeit with diminished functionality delivered by the head unit 104. The package 112 may be provided and/or enabled for execution on a revolving payment basis, where a subscription fee may be periodically paid to maintain the package 112 in service.

In an embodiment, the package 112 may comprise more software and/or firmware than is enabled. In other words, some of the software and/or firmware of the package 112 may be idle or dormant. As an example, the package 112 may comprise software and/or firmware that can provide any of a silver-grade application package, a gold-grade application package, and a platinum-grade application package. When a silver-grade application package is subscribed to, the software and/or firmware needed to provide the silver-grade application functionality executes and other software and/or firmware of the package 112 is idle or dormant. When a gold-grade application package is subscribed to, the software and/or firmware needed to provide the gold-grade application functionality executes and other software and/or firmware of the package 112 is idle or dormant. It may be that some software and/or firmware components are used to deliver two or more of the silver-grade, gold-grade, and platinum-grade application functionality.

The functionality delivered by the package 112 may be determined in part by evaluating the digital rights that are granted to the head unit 104. In an embodiment, at least some of the applications that comprise the package 112 may themselves check whether appropriate digital rights are granted to the head unit 104 before executing, for example during a power-on cycle of the head unit 104. An application may check digital rights by reading a memory location where the digital rights are stored. Alternatively an application may access a digital rights management (DRM) application that executes on the head unit 104. In an embodiment, the remote operation client 108 may receive a message from the radio transceiver 106 instructing the remote operation client 108 to synchronize the digital rights stored on the head unit 104. In response, the remote operation client 108 may instantiate a digital rights management (DRM) synchronization application 110 that accesses a merchant transaction server 130 via a network 122 coupled to the base transceiver station 120. The digital rights management synchronization application 110 retrieves the current digital rights associated with the head unit 104 and updates the head unit 104 accordingly, for example storing the updated digital rights in a memory of the head unit 104. The network 122 may comprise a private network, a public network, or a combination of private and public networks.

The digital rights, the contents of the package 112, and/or the wireless communication connectivity of the radio transceiver 106 may be different at different points in the lifecycle of the head unit 104. For example, the wireless communication connectivity provided by the base transceiver station 120 and/or by the wireless service provider may be different at different stages in the lifecycle of the head unit 104. For example, when the head unit 104 is in a vehicle 102 that has completed assembly but has not yet been delivered to a vehicle sales dealership, the wireless service provider may not provide data wireless communication support to the head unit 104. Likewise, the digital rights that are associated with the head unit 104 before the vehicle 102 is delivered to the vehicle sales dealership may be limited.

Figure 2:
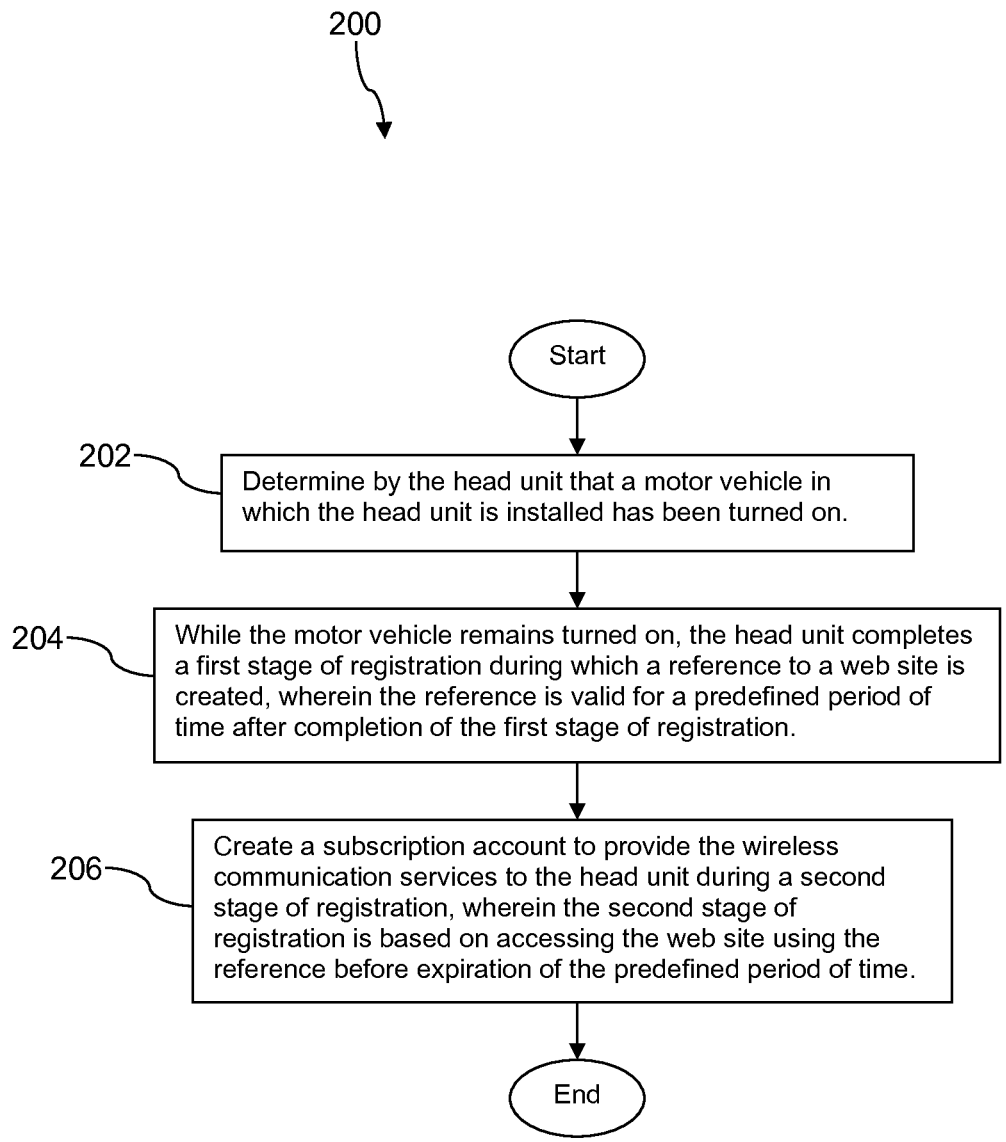
FIG. 2 is a flow chart of a method according to an embodiment of the disclosure.

Turning now to FIG. 2, a method 200 is described. At block 202, a head unit determines that the motor vehicle in which the head unit is installed is turned on. For example, the head unit 104 receives a message from a car area network (CAN) that the engine of the motor vehicle 102 is running. At block 204, while the motor vehicle remains turned on and running, the head unit completes a first stage of registration of the head unit to a subscriber account. During the first stage of registration a reference to a web site is created, where the reference is valid for a predefined period of time after completion of the first stage of registration. For example, the reference may provide access to content stored in a customer relations data store 142 coupled to a manufacturer's server 140 and/or to content provided by the manufacturer's server 140. The predefined period of time may be one day, two days, three days, or some other predefined period of time.

As part of the first stage of registration, information may be entered into the head unit 104 using an input device such as a keyboard or touchscreen. The input device may be coupled to and/or integral with the head unit 104. The information may include an email address to which the reference may be sent. The information is then transmitted by the head unit 104 via the radio transceiver 106 to the base transceiver station 120 to the network 122 to the merchant transaction server 130. In an embodiment, the first stage of registration is considered to be an at least partly secure transaction, and part of the security and/or authentication of the transaction is constituted by the fact that the motor vehicle is turned on and/or running when the transaction is completed. Trust is acceded to the transaction at least partly on the basis that access to the interior of the motor vehicle 102 while the motor vehicle 102 is turned on and running is assumed to be an authentication of the user.

At block 206, a subscription account is created and/or activated to provide the wireless communication services to the head unit during a second stage of registration. The second stage of registration is based on accessing the web site using the reference created in block 204 before the predefined time period expires. For example, after the purchaser of the motor vehicle 102 returns home, perhaps later the day of delivery of the motor vehicle 102 or possibly the next day, the purchaser checks their private email on their desktop computer at home. They find an email addressed to them by either the manufacturer of the motor vehicle 102 or the wireless communication service provider, wherein the email contains the reference or link to the web site, for example a universal reference locator (URL) or other reference. The computer user clicks on the reference.

Provided that the reference is utilized before the expiration of the predefined time period, the computer user is directed to a web site where they may enter information about themselves needed to complete set-up of a wireless subscription account. If the reference has expired, the first stage of registration must be repeated before progressing to the second stage of registration with a newly generated reference. Part of the information entered at the web site may include security information such as a password for future accessing details of the communication service account, for example to purchase new applications and/or to download applications to the head unit 104. The information may include selection of a security question and an answer to the security question.

At the end of this second stage of registration, the head unit 104 may be registered to a subscription account associated with the owner of the vehicle or with some party other than the vehicle owner. For example, the motor vehicle 102 may be owned by a wife and ownership may be registered in her name, but the head unit 104 may be registered to a wireless communication subscription account associated with a husband of the wife.

After completion of the second stage of registration, the head unit 104 and/or the merchant transaction server 130 rejects any further attempts to initiate the first stage of registration. In an embodiment, at least some of the registration information associated with the head unit 104 may be stored in a data store 132 (e.g., merchant data base) as a subscription record 134. If it is desired to register the head unit 104 to a different wireless communication subscription account, as for example when the vehicle is sold or otherwise transferred to a different owner, the head unit 104 must first be deregistered from the wireless communication subscription account. The two stage registration process as described above, where there are specific transition paths allowed between registration stages and other transition paths are disallowed, provides for securing the association of the head unit to the wireless communication subscription account.

Figure 3:
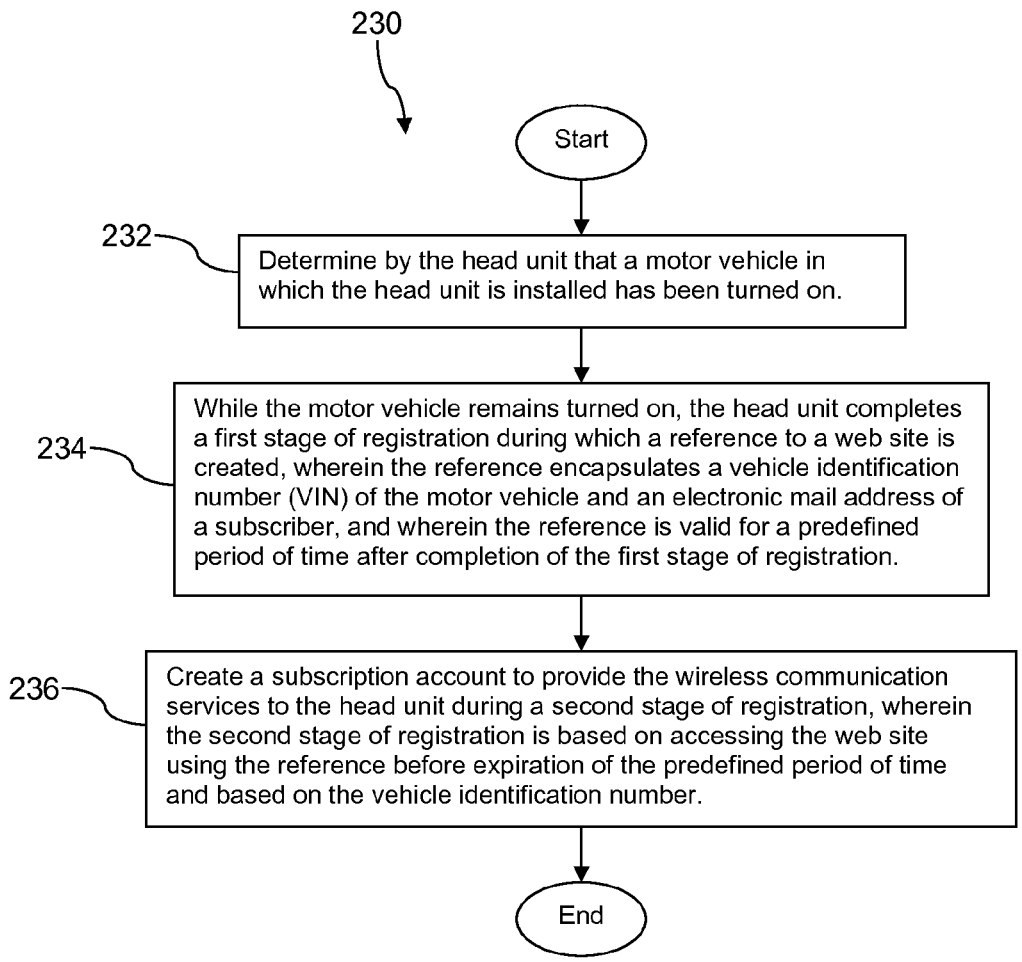
FIG. 3 is a flow chart of another method according to an embodiment of the disclosure.

Turning now to FIG. 3, a method 230 is described. The blocks 232, 234, and 236 correspond substantially to the blocks 202, 204, and 206, respectively, of the method 200 described above with reference to FIG. 2. Block 234, however, provides that the reference to the web site that is created during the first stage of registration encapsulates a vehicle identification number (VIN) of the motor vehicle 102 and an electronic mail address of a subscriber. When the user, for example an owner of the motor vehicle 102, accesses the reference that is emailed to his or her email address, the web site that is presented to this user includes information that is distinctive or unique to the motor vehicle 102. For example, the web site or web page that is presented may be customized based on the capabilities of the head unit 104 installed in the specific motor vehicle 102 the user has purchased, based on associating the VIN encapsulated in the reference to an entry in the customer relations data store 142 that identifies the capabilities of the head unit 104.

Figure 4:
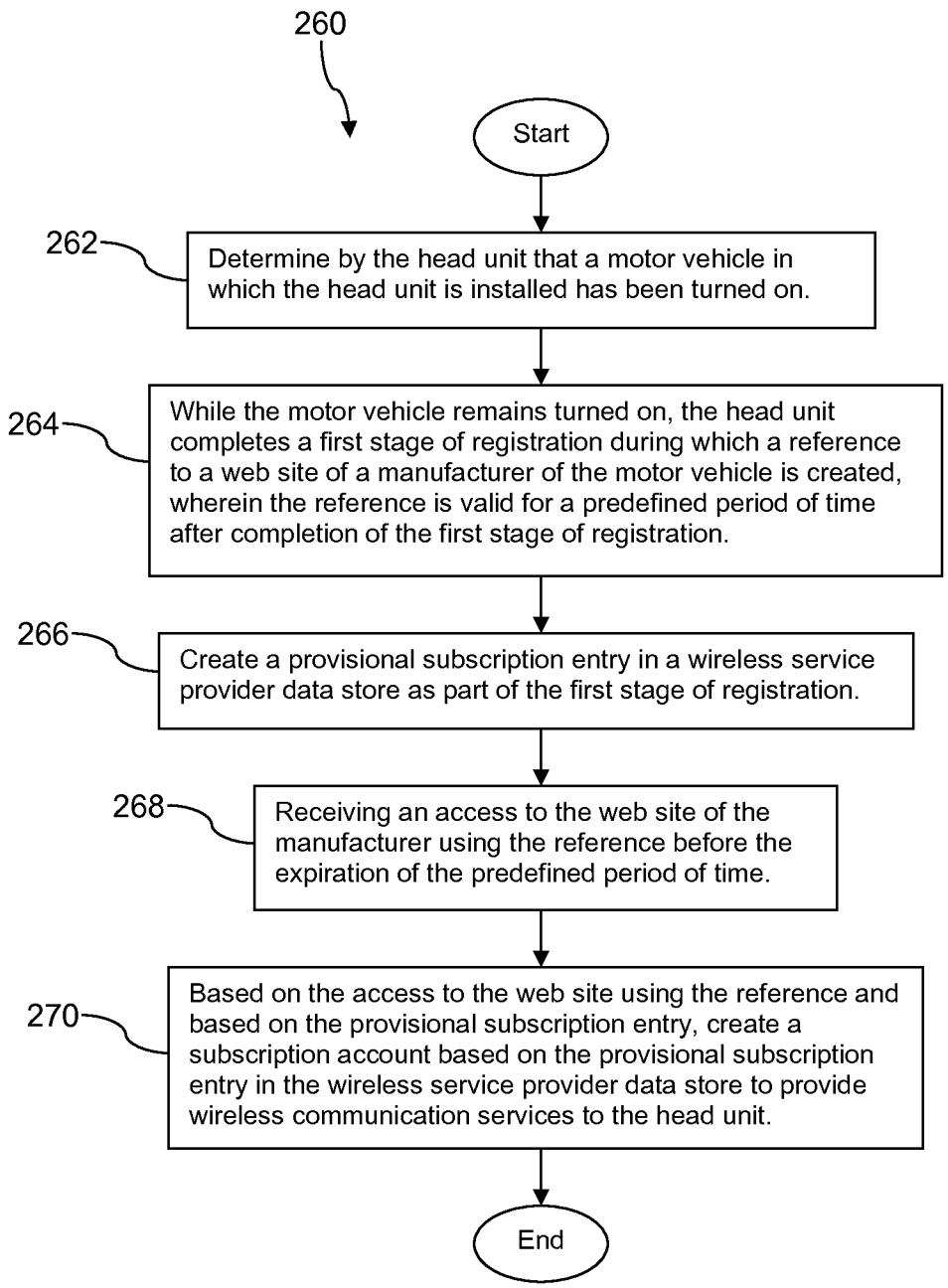
FIG. 4 is a flow chart of a different method according to an embodiment of the disclosure.

Turning now to FIG. 4, a method 260 is described. At block 262, the head unit determines that the motor vehicle in which the head unit is installed is turned on. At block 264, while the motor vehicle remains turned on, the head unit completes a first stage of registration during which a reference to a web site of a manufacturer of the motor vehicle is created, wherein the reference is valid for a predefined period of time after completion of the first stage of registration. At block 266, a provisional subscription entry is created in a wireless service provider data store as part of the first stage of registration. At block 268, an access to the web site of the manufacturer using the reference is received before the expiration of the pre-defined period of time. At block 270, based on the access to the web site using the reference and based on the provisional subscription entry, a subscription account is created based on the provisional subscription entry in the wireless service provider data store to provide wireless communication services to the head unit.

Figure 5:
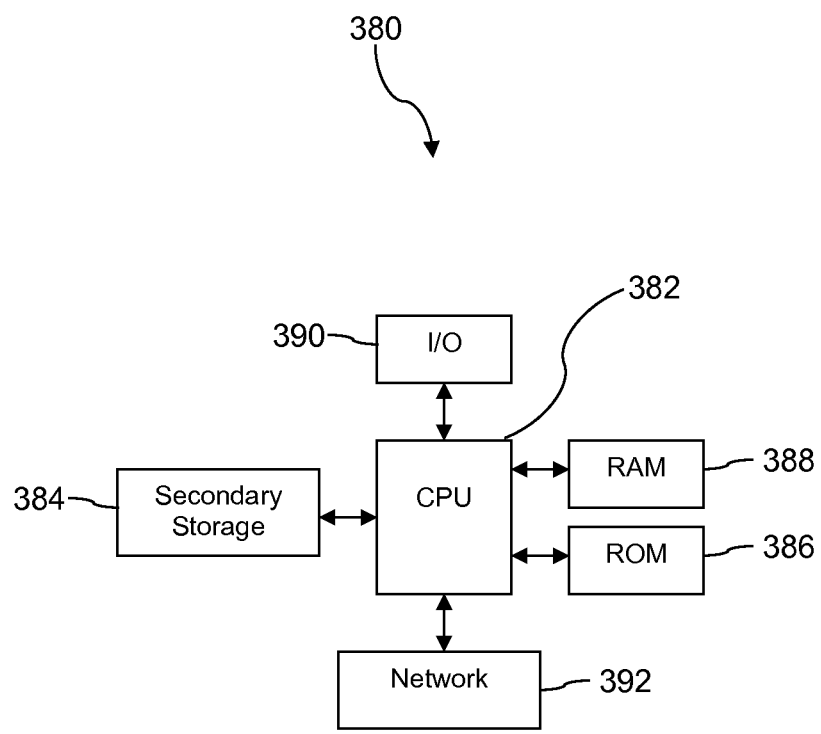
FIG. 5 illustrates a computer system according to an embodiment of the disclosure.

FIG. 5 illustrates a computer system 380 suitable for implementing one or more embodiments disclosed herein. For example, the computer system 380 may be used to implement the merchant transaction server 130 and the manufacturer server 140. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for registering an in-vehicle head unit to receive wireless communication services, comprising:
    determining by the head unit that a motor vehicle in which the head unit is installed has been turned on;
    while the motor vehicle remains turned on, the head unit completing a first stage of registration during which a reference to a web site is created, wherein the reference is valid for a predefined period of time after completion of the first stage of registration;
    creating a subscription account to provide the wireless communication services to the head unit during a second stage of registration, wherein the second stage of registration is based on accessing the web site using the reference before expiration of the predefined period of time; and
    sending a message to perform a digital rights management synchronization command to the head unit after completion of the second state of registration.

2. The method of claim 1, further comprising:
    receiving payment information to recover wireless communication subscription fees; and
    in response to receiving the payment information, enabling continued wireless communication service to the head unit.

3. The method of claim 1, wherein the head unit comprises a radio transceiver operable to wirelessly communicate with a cellular tower.

4. The method of claim 1, wherein after completion of a sale of the motor vehicle by a new vehicle dealer a first wireless service plan is enabled for the motor vehicle for a non-renewable time duration and after completion of the second stage of registration a second wireless service plan is enabled for a renewable time duration.

5. The method of claim 4, wherein the non-renewable time duration is less than 7 days and wherein the renewable time duration is at least 28 days.

6. The method of claim 1, wherein the subscription account is associated with a subscriber who is further associated with a different head unit installed in a second motor vehicle.

7. The method of claim 1, further comprising returning the head unit to an initial state in which the head unit can again complete the first stage of registration, wherein the return of the head unit to the initial state promotes a later purchaser of the motor-vehicle establishing their own wireless communication subscription for the head unit.

8. The method of claim 7, wherein returning the head unit to the initial state is initiated from one of the head unit, a customer care site operated by a provider of wireless communication services to the head unit, or a web site.

9. A method for registering an in-vehicle head unit to receive wireless communication services, comprising:
    determining by the head unit that a motor vehicle in which the head unit is installed has been turned on;
    while the motor vehicle remains turned on, the head unit completing a first stage of registration during which a reference to a web site is created, wherein the reference encapsulates a vehicle identification number (VIN) of the motor vehicle and an electronic mail address of a subscriber, and wherein the reference is valid for a predefined period of time after completion of the first stage of registration; and
    creating a subscription account to provide the wireless communication services to the head unit during a second stage of registration, wherein the second stage of registration is based on accessing the web site using the reference before expiration of the predefined period of time and based on the vehicle identification number, wherein after completion of a sale of the motor vehicle by a new vehicle dealer a first wireless service plan is enabled for the motor vehicle for a non-renewable time duration and after completion of the second stage of registration a second wireless service plan is enabled for a renewable time duration.

10. The method of claim 9, wherein the head unit presents an in-vehicle registration screen on a display coupled to the head unit and receives user input of the electronic mail address.

11. The method of claim 9, wherein the second stage of registration comprises presenting a form in a web page to receive user input of subscription account information, wherein the web page comprises information about functional capabilities of the head unit.

12. The method of claim 11, wherein the form in the web page receives user input of security information comprising a security question and security answer.

13. The method of claim 1, further comprising:
    creating a provisional subscription entry in a wireless service provider data store as part of the first stage of registration; receiving an access to the web site using the reference before the expiration of the predefined period of time, wherein the website is associated with a manufacturer of the motor vehicle, and wherein the subscription account is created based on the provisional subscription entry in the wireless service provider data store; and
    accessing, by a subscriber of the subscriber account, a data store defining digital rights associated with the subscription account by entering an identity and a password and authenticating the identity and password in the manufacturer data store.

14. The method of claim 13, wherein the predefined period of time is about 3 days.

15. The method of claim 13, wherein the predefined period of time is about 2 days.

16. The method of claim 13, wherein completing the first stage of registration comprises inputting subscriber information.

17. The method of claim 16, wherein the subscriber information comprises an electronic mail address.

18. The method of claim 13, wherein the reference to the web site incorporates a vehicle identification number.

* * * * *